(12) United States Patent
Laurence

(10) Patent No.: US 10,309,070 B2
(45) Date of Patent: Jun. 4, 2019

(54) METHODS AND APPARATUS FOR STABILIZATION OF SURFACES

(71) Applicant: Polylast Systems, LLC, Scottsdale, AZ (US)

(72) Inventor: Peter J. Laurence, Scottsdale, AZ (US)

(73) Assignee: Polylast Systems, LLC, Scottsdale, AZ (US)

( * ) Notice: Subject to any disclaimer, the term of this patent is extended or adjusted under 35 U.S.C. 154(b) by 0 days.

(21) Appl. No.: 15/218,020

(22) Filed: Jul. 23, 2016

(65) Prior Publication Data

US 2017/0002533 A1 Jan. 5, 2017

Related U.S. Application Data

(63) Continuation-in-part of application No. 14/511,094, filed on Oct. 9, 2014, now Pat. No. 9,499,716, which
(Continued)

(51) Int. Cl.
| | |
|---|---|
| *E02B 11/00* | (2006.01) |
| *A63B 69/36* | (2006.01) |
| *B29C 39/02* | (2006.01) |
| *B29C 39/00* | (2006.01) |
| *B29B 7/00* | (2006.01) |
| *E02D 17/20* | (2006.01) |

(Continued)

(52) U.S. Cl.
CPC ........... *E02B 11/00* (2013.01); *A01M 21/043* (2013.01); *A63B 69/3691* (2013.01); *B29B 7/002* (2013.01); *B29C 39/006* (2013.01); *B29C 39/02* (2013.01); *C08G 18/242* (2013.01); *C08G 18/307* (2013.01); *C08G 18/48* (2013.01); *C09D 175/04* (2013.01); *C09J 175/04* (2013.01); *E01C 3/006* (2013.01); *E01C 3/06* (2013.01); *E01C 13/06* (2013.01); *E02D 17/202* (2013.01); *B29K 2075/00* (2013.01); *B29K 2105/16* (2013.01); *B29K 2105/26* (2013.01); *B29K 2421/00* (2013.01); *B29L 2031/10* (2013.01); *C08L 95/00* (2013.01)

(58) Field of Classification Search
CPC ...................................................... E01C 13/04
USPC .......................................... 405/302.4–302.7
See application file for complete search history.

(56) References Cited

U.S. PATENT DOCUMENTS 4,787,776 A * 11/1988 Brady ................. D06M 15/643
405/270
5,554,373 A 9/1996 Seabrook et al.
(Continued)

*Primary Examiner* — Tara Mayo-Pinnock
(74) *Attorney, Agent, or Firm* — The Noblitt Group, PLLC

(57) ABSTRACT

Various embodiments provide surface compositions and methods for porous, flexible, and durable surfaces that may stabilize native soil, provide substantially uniform drainage of moisture, and provide a barrier between the native soil, vegetation, and other compositions disposed over the surface composition, such as sand and/or soil. The compositions and methods may comprise utilizing a liquid coating composition, liquid binder, and/or antimicrobial composition in combination with a particulate material configured to provide a desired pore size, elasticity, compression, and/or stability to the surface composition. Various embodiments of the surface composition may form a prefabricated flexible bunker liner for application to the native soil in a golf course bunker beneath sand.

18 Claims, 7 Drawing Sheets

Figure 1A:
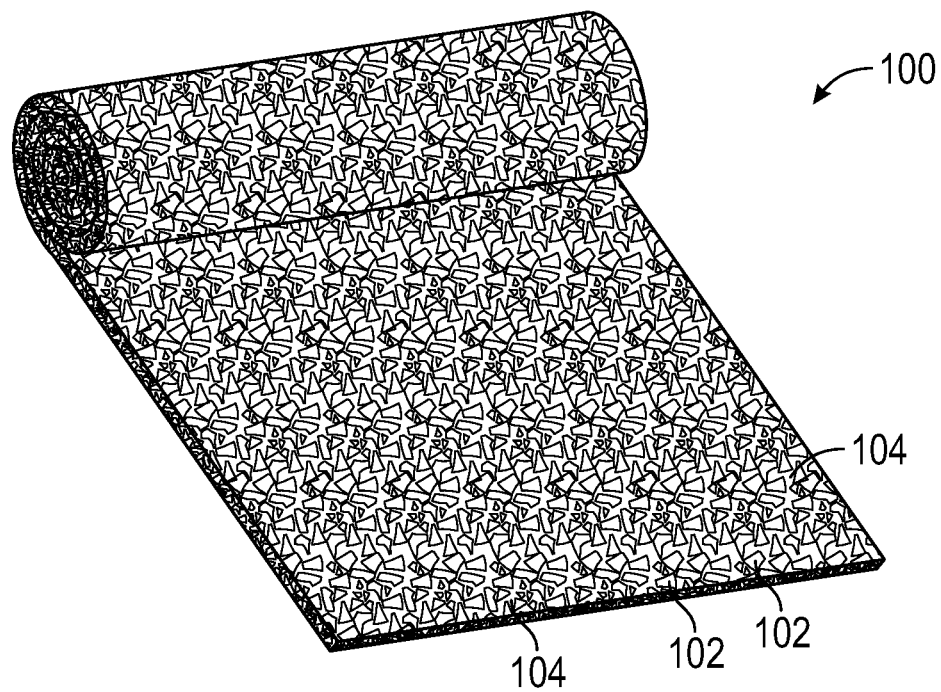

Related U.S. Application Data is a continuation-in-part of application No. 13/702,644, filed as application No. PCT/US2011/040108 on Jun. 10, 2011, now abandoned.

(60) Provisional application No. 62/196,194, filed on Jul. 23, 2015, provisional application No. 61/397,342, filed on Jun. 10, 2010.

(51) Int. Cl.

| | | |
|---|---|---|
| *A01M 21/04* | (2006.01) | |
| *C09D 175/04* | (2006.01) | |
| *C08G 18/30* | (2006.01) | |
| *C09J 175/04* | (2006.01) | |
| *C08G 18/24* | (2006.01) | |
| *C08G 18/48* | (2006.01) | |
| *E01C 3/00* | (2006.01) | |
| *E01C 3/06* | (2006.01) | |
| *E01C 13/06* | (2006.01) | |
| *B29K 75/00* | (2006.01) | |
| *B29K 105/16* | (2006.01) | |
| *B29K 421/00* | (2006.01) | |
| *B29K 105/26* | (2006.01) | |
| *B29L 31/10* | (2006.01) | |
| *C08L 95/00* | (2006.01) | |

(56) References Cited

U.S. PATENT DOCUMENTS

| | | | |
|---|---|---|---|
| 6,145,248 A | 11/2000 | Bergevin | |
| 8,062,143 B1 | 11/2011 | Meersman | |
| 8,138,234 B2 | 3/2012 | Brown | |
| 8,845,443 B1* | 9/2014 | Weaver | E01C 13/065 405/302.6 |
| 2003/0000135 A1 | 1/2003 | Burnham | |
| 2003/0215637 A1* | 11/2003 | Kvesic | C08L 19/003 428/403 |
| 2005/0186031 A1* | 8/2005 | Suazo | E02B 5/02 405/121 |
| 2009/0038214 A1 | 2/2009 | Pozen | |
| 2012/0020730 A1 | 1/2012 | Chow | |
| 2013/0184090 A1* | 7/2013 | Sternberg | E01C 7/142 473/173 |
| 2015/0023732 A1 | 1/2015 | Laurance | |

\* cited by examiner

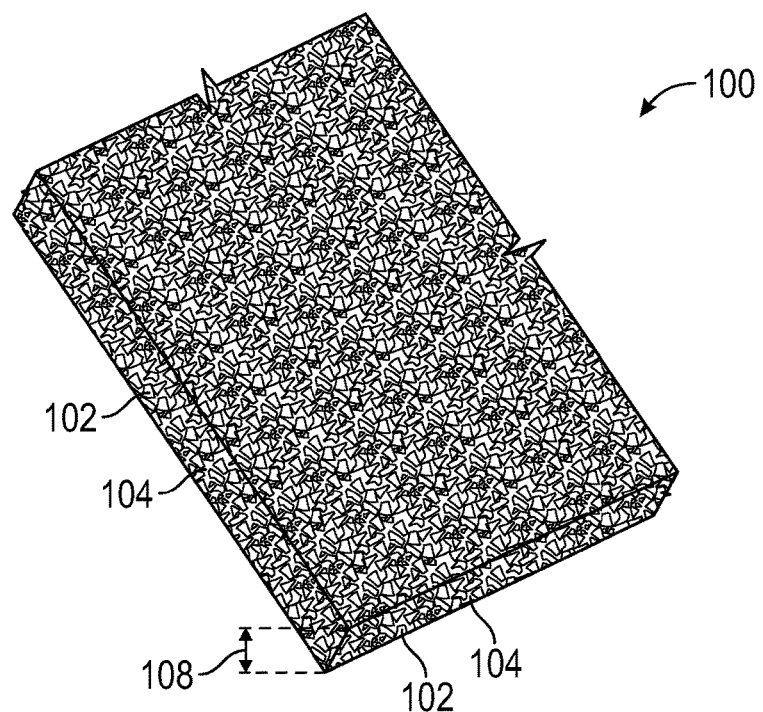
FIG. 2
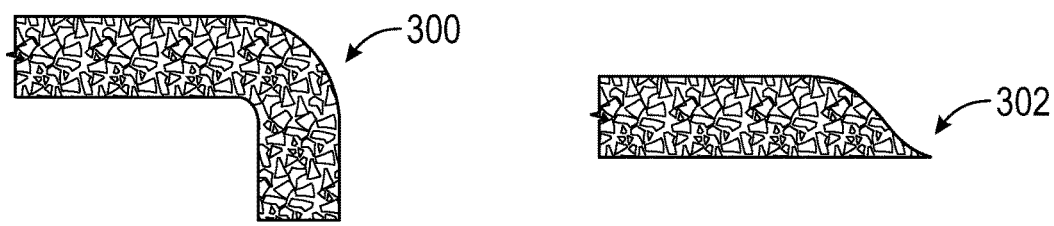
FIG. 3A
FIG. 3B

METHODS AND APPARATUS FOR STABILIZATION OF SURFACES

CROSS REFERENCES TO RELATED APPLICATIONS

This application claims the benefit of U.S. Provisional Application No. 62/196,194 filed Jul. 23, 2015, entitled "Methods and Apparatus for Stabilization of Surfaces," and this application is a continuation-in-part of U.S. patent application Ser. No. 14/511,094, filed on Oct. 9, 2014, entitled "Methods and Apparatus for Stabilization of Surfaces," which is a continuation-in-part of U.S. patent application Ser. No. 13/702,644, filed on Jan. 18, 2013, entitled "Manhole, Roadway and Walkway Repair," which is the National Stage Entry of International Patent Application No. PCT/US11/40108, filed on Jun. 10, 2011, designating the United States of America, which claims priority to U.S. Provisional Patent Application Ser. No. 61/397,342, filed on Jun. 10, 2010, and incorporates the disclosure of all such applications by reference. To the extent that the present disclosure conflicts with any referenced application, however, the present disclosure is to be given priority.

BACKGROUND

Golf course sand traps, also called "bunkers," are sand-filled surfaces that are typically installed in areas of native soil and vegetation. Bunkers surfaces are covered with sand that is costly due to the criteria of its selection such as substantially uniform particle size as dictated by USGA standards, particle shape that provides firmness such as angular particles that tend to interlock together for a firm footing, and even aesthetic needs for sand color.

Maintenance of bunker sand is known to be formidable to consistently provide a surface of even thickness that is not too soft, not too hard, not too dry, and not too wet as perceived by golfers. Maintaining the bunker sand requires routine raking of the sand, edging of the grass surrounding the bunker, weed control to prevent contamination of the sand with weeds arising from the underlying native soil, and removal of silt, clay, organic matter, pebbles, and rocks that contaminate the sand as an aging bunker develops inadequate drainage.

Inconsistent moisture content and inadequate drainage may adversely affect playing conditions and may ultimately lead to costly repairs for replacement sand and/or bunker renovation. Natural variations in the native soil under the sand may cause loss of sand into the underlying native soil, pooling of water in portions of the bunker, sand that contains uneven moisture with dry spots and wet spots, and undesirable particles migrating from the native soil into the sand which may cause hazards to golfers and/or maintenance equipment. Blurring of the delineation between the bunker and the surrounding native surface of grass, turf, or native soil, also adversely affects play due to golf rules about what the golfer can and cannot do prior to hitting a ball lying in this junction.

SUMMARY

Various embodiments provide surface compositions and methods for porous, flexible, and durable surfaces that may stabilize native soil, provide substantially uniform drainage of moisture, and provide a barrier between the native soil, vegetation, and other compositions disposed over the surface composition, such as sand and/or soil. The compositions and methods may comprise utilizing a liquid coating composition, liquid binder, and/or antimicrobial composition in combination with a particulate material configured to provide a desired pore size, elasticity, compression, and/or stability to the surface composition. Various embodiments of the surface composition may form a prefabricated flexible bunker liner for application to the native soil in a golf course bunker beneath sand to maintain sand quality, control moisture, and prolong bunker life.

BRIEF DESCRIPTION OF THE DRAWING FIGURES

A more complete understanding of the present invention may be derived by referring to the detailed description when considered in connection with the following illustrative figures. In the following figures, like reference numbers refer to similar elements and steps throughout the figures.

Elements and steps in the figures are illustrated for simplicity and clarity and have not necessarily been rendered according to any particular sequence or scale. For example, steps that may be performed concurrently or in different order are illustrated in the figures to help to improve understanding of embodiments of the present invention.

Figure 1B:
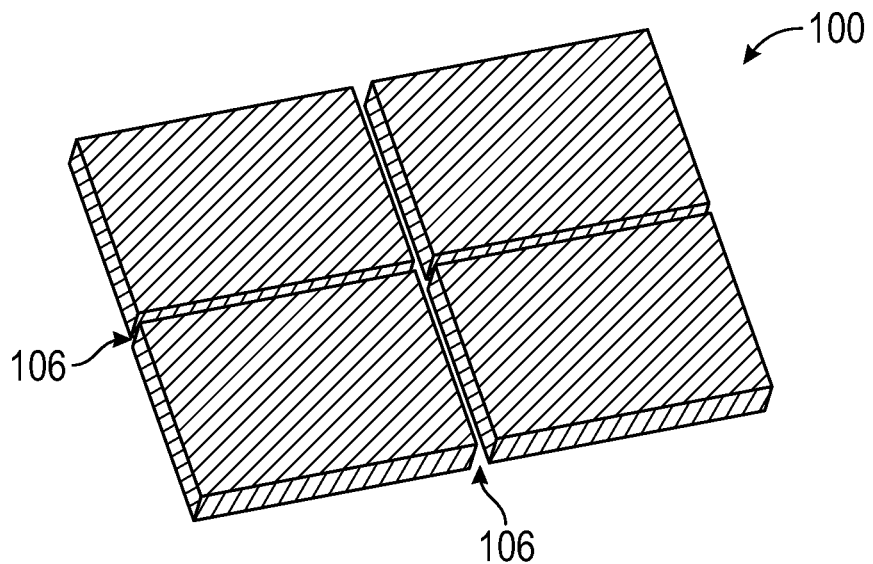
Figure 4A:
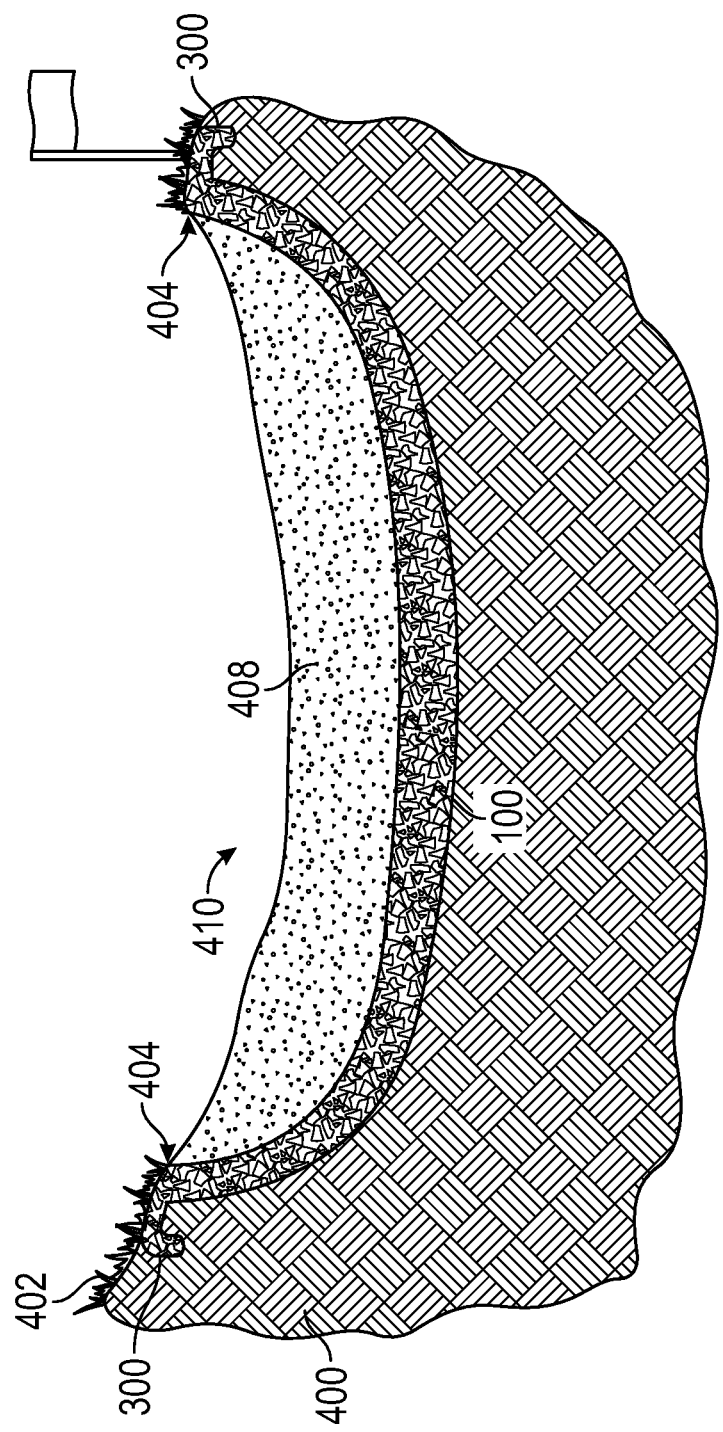
Figure 4B:
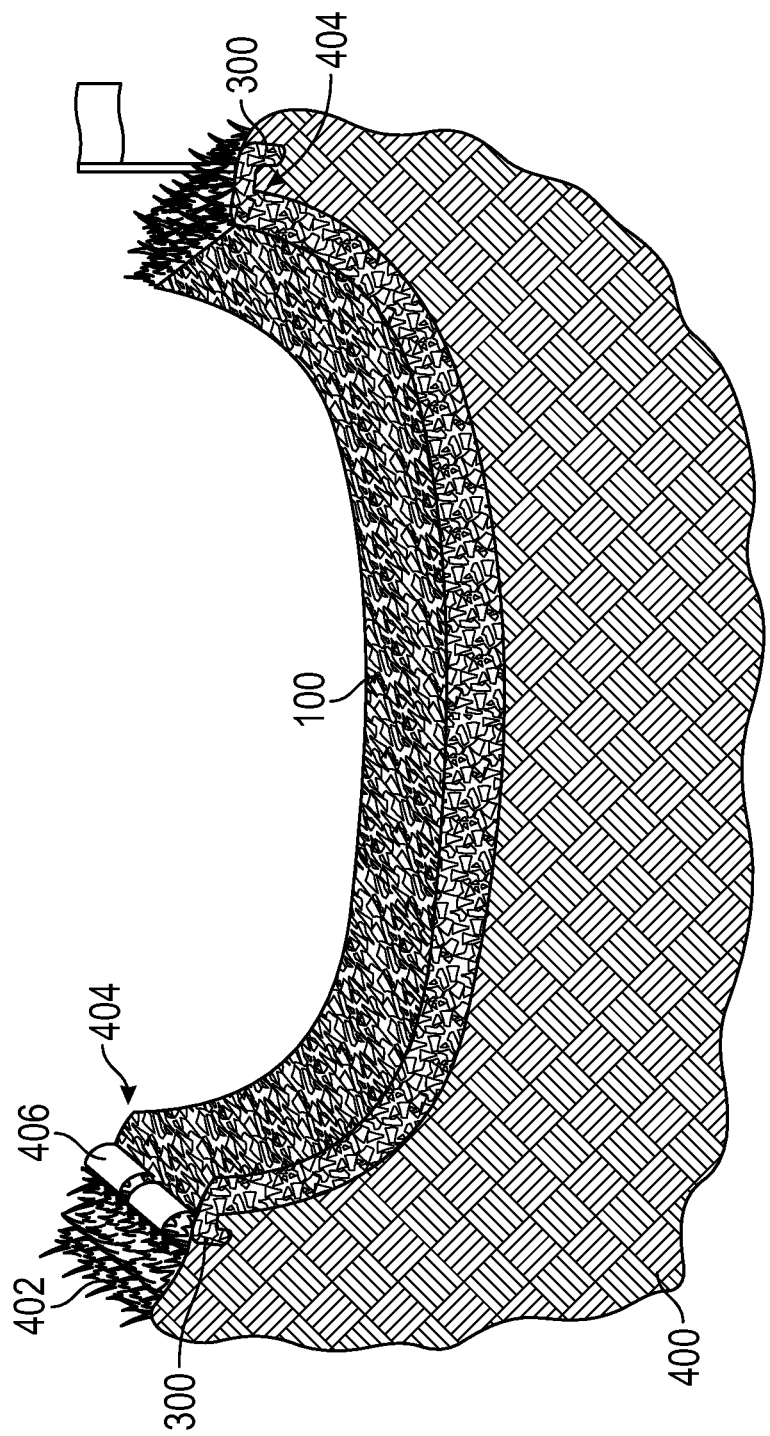
Figure 5:
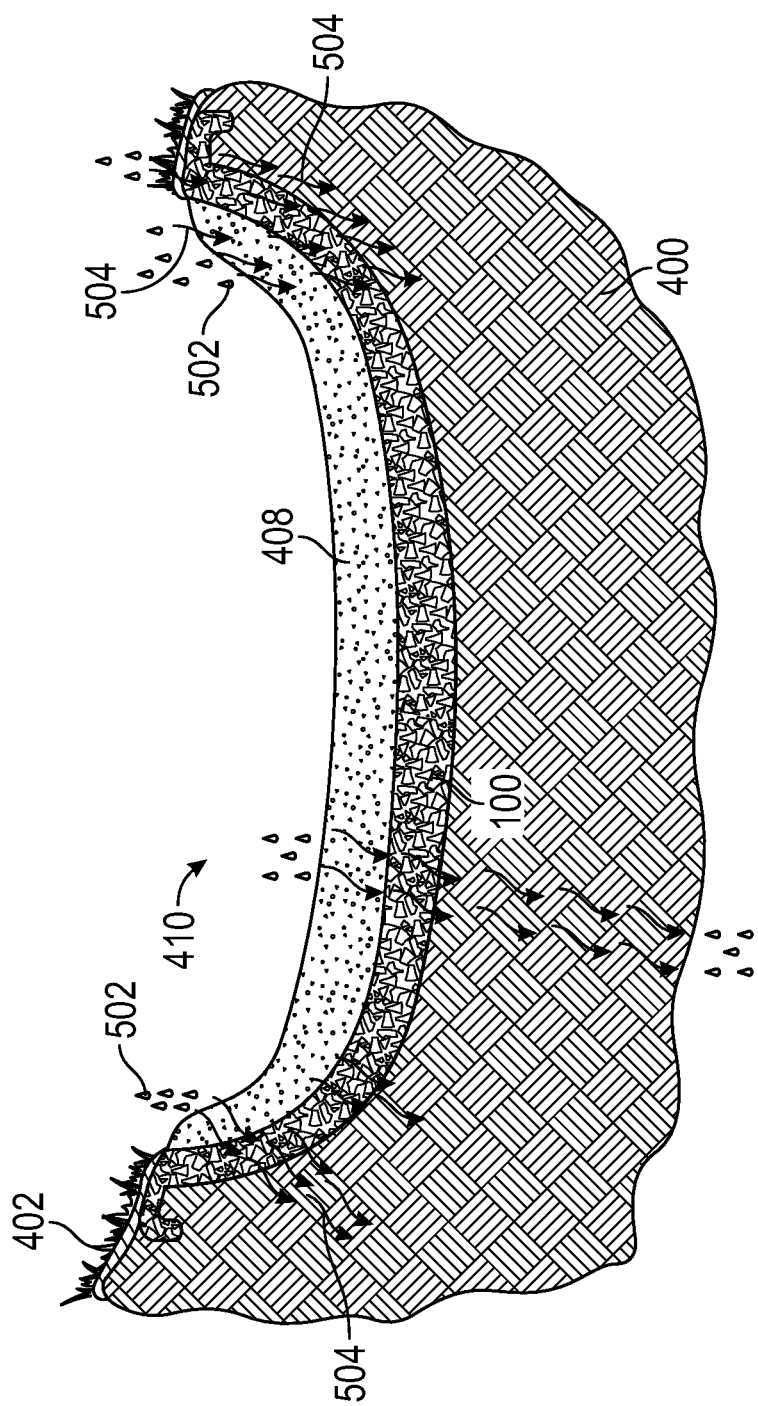
Figure 6:
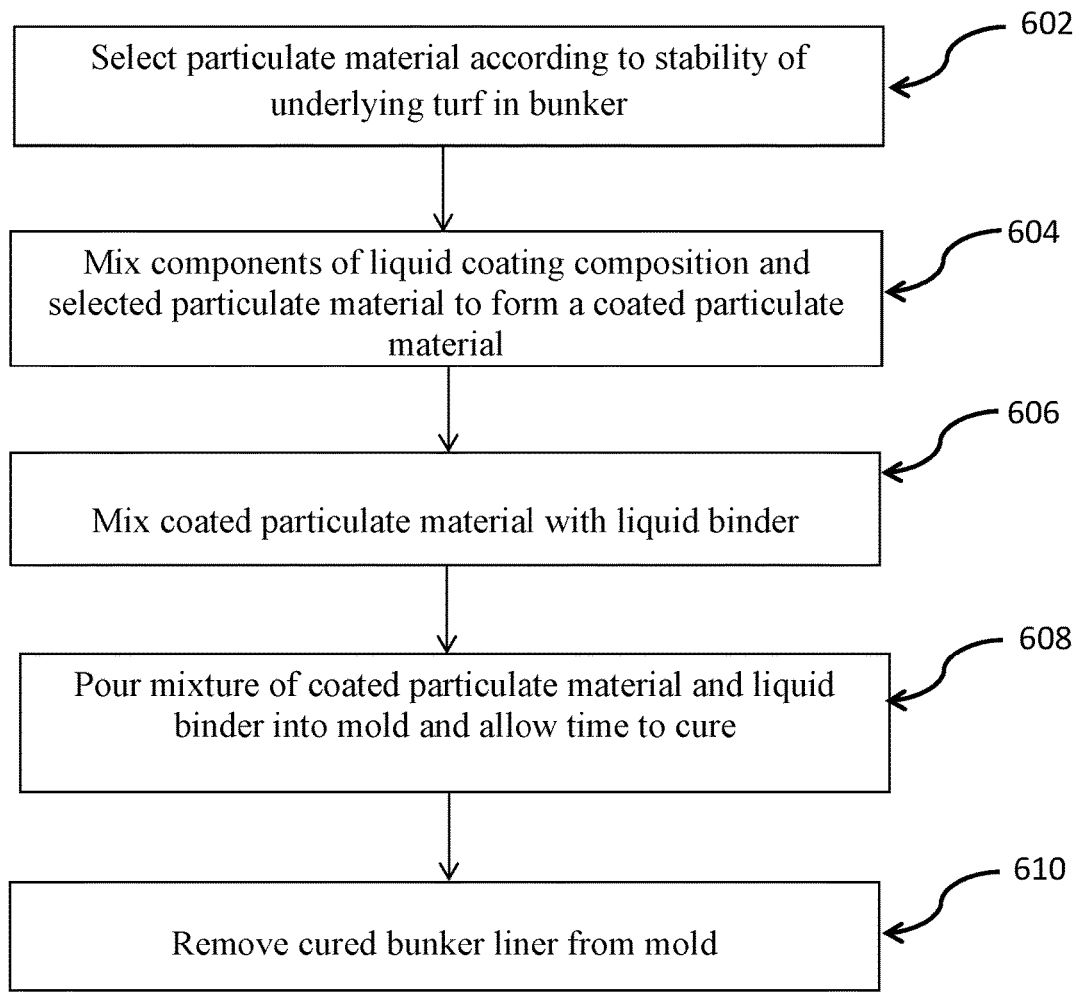
Figure 7:
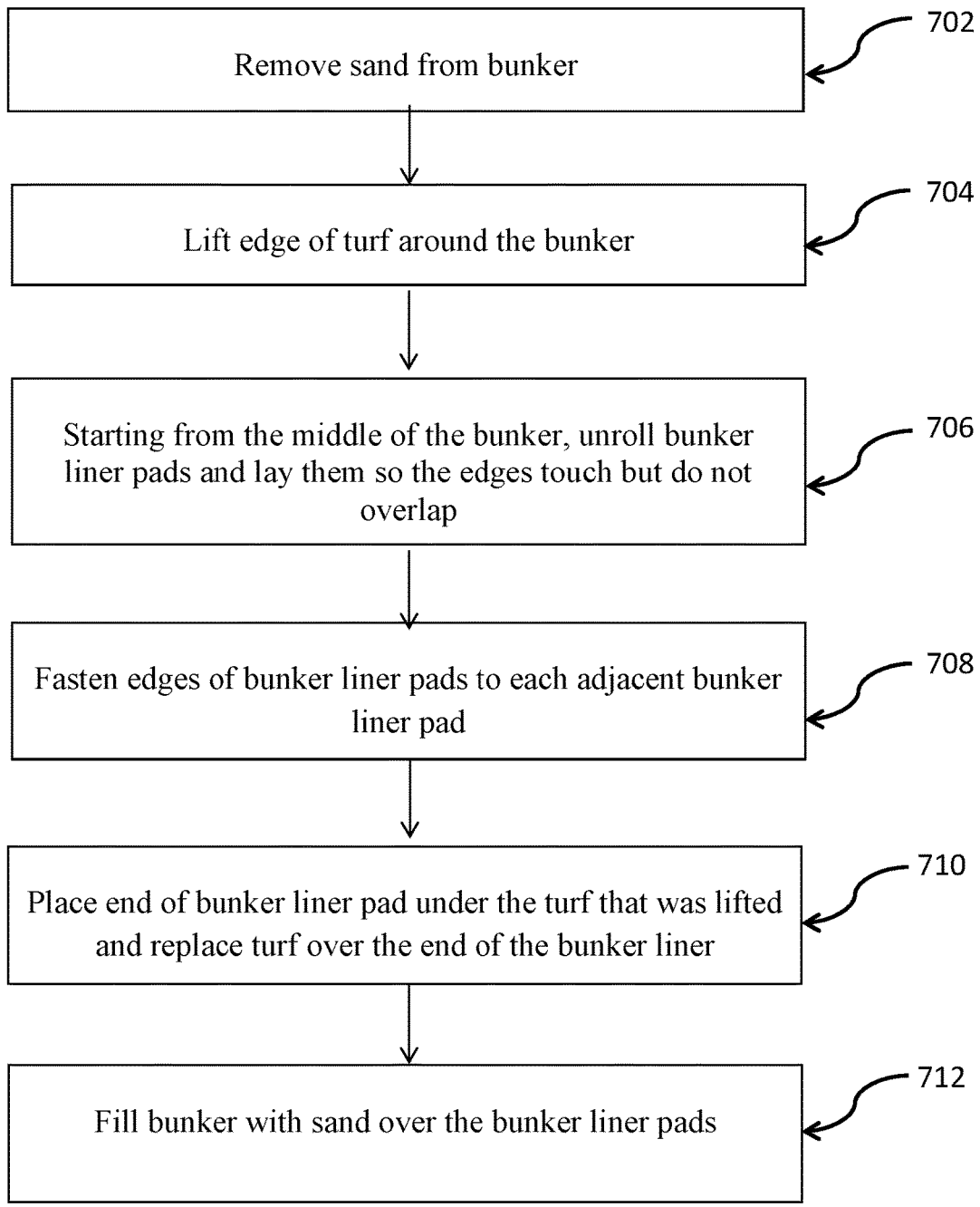

The figures described are for illustration purposes only and are not intended to limit the scope of the present disclosure in any way. Various aspects of the present invention may be more fully understood from the detailed description and the accompanying drawing figures, wherein:

FIGS. 1A-B representatively illustrate a top view of exemplary bunker liner system comprising bunker liner rolls and pads;

FIG. 2 representatively illustrates a side view of an exemplary bunker liner;

FIGS. 3A-B representatively illustrate exemplary turned-down edges in a bunker liner;

FIGS. 4A-B representatively illustrate an exemplary bunker liner installed in a bunker;

FIG. 5 representatively illustrates the movement of water through sand and an exemplary bunker liner;

FIG. 6 is a flow chart illustrating an exemplary method of forming an exemplary bunker liner; and FIG. 7 is a flow chart illustrating an exemplary method of installing a bunker liner pads into a golf course bunker.

DETAILED DESCRIPTION OF EXEMPLARY EMBODIMENTS

The present invention may be described in terms of functional block components and various processing steps. Such functional blocks may be realized by any number of components configured to perform the specified functions and achieve the various results. For example, the present invention may employ various process steps, apparatus, systems, methods, materials, etc. In addition, the present invention may be practiced in conjunction with any number of devices used to mix components, prepare native soil, landscaping, installing a bunker liner, and/or connecting separate pieces of adjacent bunker liner, and the system described is merely one exemplary application for the invention.

The particular implementations shown and described are illustrative of the technology and its best mode and are not intended to otherwise limit the scope of the present technology in any way. For the sake of brevity, conventional manufacturing, preparation, process steps, and other functional aspects of the composition may not be described in detail. Furthermore, connecting lines shown in various figures are intended to represent exemplary functional relationships and/or steps between the various elements. Many alternative or additional functional relationships or process steps may be present in a practical composition and method.

Various embodiments of the present technology provide compositions, methods, and systems for making a surface composition and applying the surface composition to an area of native soil and vegetation. In a particular embodiment, the surface composition may be a bunker liner for use in golf course bunkers beneath a layer of sand. The various embodiments of the bunker liner may provide a permanent, stabilizing barrier over the natural soil underlying the bunker and provide a substantially even drainage system for water out of the bunker. A detailed description of various embodiments is provided as a specific enabling disclosure that may be generalized to any application of the disclosed composition and methods in accordance with the various described embodiments.

In various embodiments, representative surface compositions for flexible bunker liners and installation methods thereof may employ a liquid coating composition comprising a polyol, particulate material to be coated by the liquid coating composition, and a liquid binder comprising a moisture curing polyurethane for binding the coated particulate matter together into elongated bunker liners having a molded shape appropriate for laying across the surface of a bunker. In various embodiments, the bunker liners may further comprise antimicrobial compositions and/or herbicides. Various embodiments of the surface composition may provide practical utilization of the technology in a wide range and size of applications without specialized equipment, heat, pressure, and/or skilled tradesmen.

Representative methods of applying the bunker liners to a golf course bunker may be performed with conventional equipment including landscaping equipment for removing sand from the bunker, fasteners such as staples and adhesives for connecting adjacent bunker liners, equipment for loading and unloading the bunker liners from a transport vehicle, and the like. In some embodiments, the bunker liners may be manufactured remotely in the form of tiles, pads, and/or rolls.

In various embodiments of the present technology, the surface composition may achieve desired physical properties of durability, flexibility, and/or elongation capabilities to allow the surface composition to expand and contract with ambient temperature variations. Some embodiments of the surface composition may exhibit strength, compaction capability, adherence to the surrounding surface, and/or stabilization of the surrounding surface.

The surface composition may comprise any suitable component or mixture of components. For example, in some embodiments, the surface composition may comprise multiple components mixed together and allowed to cure. In one embodiment, the components and/or amount of components in the surface composition may be varied to control the final hardness of the surface composition as well as controlling the timing for the surface composition to harden. In various embodiments, the surface composition may be delivered to the site of the surface to receive the surface composition, ready to apply such that the application does not need special skills, materials, and/or equipment to apply the surface composition to the surface.

In various embodiments of the present technology, the surface composition 100 may comprise a liquid coating composition. In some embodiments, the liquid coating composition may be mixed with and coat the particulate material. For example, in one embodiment, the mixture of the particulate material and the liquid coating composition may be approximately 1-2% by weight of the liquid coating composition. In various embodiments, any amount of the liquid coating composition may be used to adequately coat the particulate material.

In various embodiments, the liquid coating composition may comprise a polyol and at least one of a catalyst, an acid, and water. In various embodiments, the polyol may be a polyester polyol, a polyether polyol, a polyoxypropylene-, and/or a polyoxypropylene-polyoxyethelene polyol. For example, the polyether polyol or polyester polyol may have a molecular weight (molar mass) from approximately 100 to approximately 9,000 g/mol, such as: 1,000 to 6,000 g/mol, 1,500 to 5,000 g/mol, or 2,000 to 4,000 g/mol.

In various embodiments, the liquid coating composition may comprise a catalyst to initiate curing. For example, the catalyst may comprise a metal catalyst comprising mercury, lead, tin, bismuth, and/or zinc. In some embodiments, the catalyst may comprise dibutyl tin dilaurate and dibutyl tin mercaptide, In one embodiment, the tin catalyst may comprise Fomrez tin catalysts. In some embodiments, the catalyst may comprise an amine catalyst.

In various embodiments, the acid of the liquid coating composition may comprise an organic acid and/or an inorganic acid. For example, the acid may comprise any suitable form of phosphorus and/or sulfur such as phosphoric acid, sulphuric acid, and/or an acid ester. In some embodiments, the liquid coating composition may be formed as a reaction of the polyol and the acid with or without water. In an example reaction, the liquid coating composition may be formed by reaction of the polyol with about 1.0% to about 40% by weight of the acid. The reaction may occur at any temperature between about 10° C. and 50° C., such as at room temperature. Various exemplary embodiments of the liquid coating composition may be as follows: (1) 10% phosphoric acid (85%), 50% water, 1% dibutyl tin dilaurate, and 39% polyetherpolyol; (2) 48.75% polyetherpolyol, 50% water, and 1.25% dibutyl tin mercaptide; (3) 50% polyetherpolyol, and 50% water; (4) 88.85% polytherpolyol, 10% phosporic acid (85%), and 1.25% dibutyl tin mercaptide; (5) 90% polyetherpolyol and 10% Sulfuric acid; and (6) 48.75% polyetherpolyol, 1.25% dibutyl tin mercaptide, and 50% water.

In various embodiments of the present technology, the particulate material may comprise and/or be mixed with any material or mixture of materials that retains an at least partial flexibility within the cured bunker liner. Flexibility of the bunker liner may accommodate the contours of the golf course bunker and allow the bunker liner to lay over the edges of the bunker, under the turfgrass that may surround the bunker.

In various embodiments, the particulate material may comprise various types of synthetic and/or recycled rubber granules such as butatiene-rubber (BR), styrene butatiene-rubber (SBR), isoprene-rubber (IR), styrene-isoprenbutatiene-rubber (SIBR), acrylonitrilbutadiene-rubber (NBR), chloroprene-rubber (CR), isobutene-isoprene-rubber (IIR), ethylene-propylene-diene-monomer-rubber (EPDM) and natural rubber (NR), and/or vulcanized thermoplastic (TPV). The rubber granules may be any suitable size, such as approximately 0.1-100 mm. In some embodiments, the particulate material may comprise recycled asphalt, asphalt pellets, pebbles, pea gravel, aggregate of various sizes, and/or other materials having similar properties, including any material that one of ordinary skill in the art would appreciate as interchangeable with those described above.

In some embodiments, the surface composition for the bunker liner may be sent to users as part of an installation package. The installation package may include the pre-coated particulate material and/or pre-measured containers of the liquid coating composition, liquid binder, particulate material, and/or additives to be combined on the site of the golf course bunker.

In various embodiments of the present technology, the surface composition 100 may comprise a liquid binder. In various embodiments, the liquid binder may adhere the particulate material coated with the liquid coating composition. The liquid binder may comprise a moisture curing pre-polymer in such quantity as to coat the surfaces of the coated particle matter, causing them to adhere while leaving the interstices between the granules void to enable the uncured pre-polymer to come into contact with airborne water. For example, in one embodiment, approximately 88% by weight of the coated particulate matter (ie., the mixture of the particulate material with the liquid coating composition) may be mixed with approximately 12% by weight of the liquid binder. In various embodiments, the liquid binder may comprise approximately 2-10% by weight of the mixture of the coated particulate matter and the liquid binder.

The uncured mixture may then be poured into a mold of any desired shape and allowed to cure. The mold may be any desired shape with any desired dimensions. For example, to produce a cured bunker liner, the mold may comprise a piece of plywood with borders that may be ⅜ to ½ inch thick or several inches thick depending on the desired thickness of the resulting cured bunker liner. In some embodiments, the plywood may be overlaid with a lubricant and/or plastic film to prevent the bunker liner from sticking to the wood form while curing.

In various embodiments, the liquid coating composition may further comprise an additive. In one embodiment, the additive may comprise a pigment for aesthetic purposes. In another embodiment, the additive may comprise a chain extender and/or cross linker for modifying the structure of the resulting polymer to enhance properties such as tensile strength, elongation, and/or tear resistance. In another embodiment, the additive may comprise an expander material that may increase the volume of the liquid coating composition for applications such as covering large bunker areas. The expander material may comprise any compound that increases the volume of the liquid binder without adversely affecting the liquid binder's ability to cure. For example, in one embodiment, the expander material may comprise butanediol.

Various embodiments of the present technology may incorporate one or more herbicides to inhibit, reduce, and/or prevent the growth of weeds and any other unwanted vegetation. The herbicide may further reduce or prevent the growth of vegetation up through the bunker liner to contaminate the sand overlaying the bunker liner. The herbicide may be any suitable herbicide that may be embedded or sprayed onto the bunker liner. For example, the herbicide may be a broad spectrum nonselective herbicide that may kill most plants. In some embodiments, the herbicide may be selective to target particular plants, such as common weeds, and leave the turfgrasses unaffected. Exemplary herbicides may comprise herbicidal compounds such as amicarbazone, sulfentrazone, quinclorac, surfactants, carfentrazone, and/or any other appropriate herbicide as selected based on the type of turfgrass near the bunker liner installation.

Various embodiments of the present technology may incorporate antimicrobial compounds to inhibit, reduce, and/or prevent the growth of bacterial, fungal, and/or viral pathogens. In some embodiments, one or more antimicrobial compound may be embedded into the surface composition. For example, prior to mixing the components of the surface composition, the antimicrobial compound may be added to one or more of the particulate material, the liquid coating composition, and the liquid binder. In various embodiments, various pathogens introduced to the surface composition through human and animal foot traffic and/or animal waste or any other sources of pathogens may not survive or propagate on the resultant surface composition.

In various embodiments of the present technology, the antimicrobial composition may comprise any element and/or compounds that kills or inhibits the growth of microorganisms. In some embodiments, the antimicrobial composition may remain active in a variety of conditions such as high moisture, arid conditions, freezing temperatures, and/or high heat conditions. In some embodiments, the activity of the antimicrobial composition may not be affected by the exothermic reaction temperatures during curing of the surface composition.

In some embodiments, the antimicrobial composition may comprise antifungal, antiviral, antiprotozoal, and/or antibacterial compounds. For example, the antimicrobial composition may comprise at least one or more of: silver ions, zirconium phosphate-based silver ion, a polycarbonate polyol, dicyclohexylmethane diisocyanate, stannous octoate, bismuth carboxylate, tris(nonylphenyl)phosphite, triclosan, metallic compounds containing silver, zinc or copper (e.g., silver diazepine complexes, polymeric silver compounds, polymeric copper compounds, polymeric zinc compounds, copper compounds of saccharin, zinc compounds of saccharin, and silver compounds of saccharin, silver saccharinate), titanium oxide, Organosilane, Light-activated antimicrobials (e.g. titanium dioxide or photosensitisers), Quaternary ammonium compounds, Polycationic polymers (e.g. polyhexamethylene biguanide, PHMB), metal ions (e.g. $Ag^+$, $Cu^{++}$, $Zn^{++}$), silver metal, silver salts (silver sulfadiazine, silver halides (e.g., silver fluoride, silver chloride, silver bromide, silver iodide), silver acetate, silver hydroxide, silver carbonate, silver oxalate, silver phosphate, silver sulfate, silver chlorate, silver bromate, silver iodate, gold, zinc, cerium, platinum, palladium, tin, mercury, lead, bismuth, cadmium, chromium, thallium, metal sulfadiazines, metal halides (e.g., metal fluorides, metal chlorides, metal bromides, metal iodides), metal acetates, metal hydroxides, metal carbonates, metal oxalate, metal phosphates. metal sulfates, metal chlorates, metal bromates, metal iodates, zeolite compounds, silver zirconium phosphate, zinc oxides, ammonium compounds, antimicrobial polymers (e.g., polymeric biocides, biocidal polymers, and biocide-releasing polymers), alcohols, tebuconazole, propiconazole, azoles such as thiabendazole, propiconazole, tebuconazole, and mixtures thereof, Oxathiazine, ortho-phenyl phenol, and Ttriamine diamines: 1,3,5-triazine-2,4-diamine, cyclopropyl-N'-(1,1-dimethylethyl)-6-(methylthio)-1,3,5-triazine-2,4-diamine.

In some embodiments, the antimicrobial composition may comprise derivatives of phenol such as derivatives of phenol, such as halogenated phenols, bis-phenols, alkyl-substituted phenols, and polyphenols, including, but not limited to, 5-chloro-2-(2,4-dichlorophenoxy)phenol (e.g., triclosan, Microban® Additive B, Microban International Ltd., Huntersville, N.C., USA), 2-phenylphenol sodium salt tetrahydrate, 4-(tert-butyl)-2-(2-hydroxyphenyl)phenol, 4-ethyl-2-

(2-hydroxyphenyl)phenol, 4-(4-hydroxybutyl)-2-(2-hydroxyphenyl)phenol, 4-(hydroxymethyl)-2-(2-hydroxyphenyl)anisole, 4-(hydroxymethyl)-2-(2-hydroxyphenyl)phenol, 2-(2-hydroxyphenyl)-4-benzylphenol, 4-ethyl-2-phenylphenol, 2-phenyl-4-propylphenol, 5-Isopropyl-biphenyl-2-ol, 4-[4-(tert-butyl) phenyl]phenol, 4-(1,1-dimethylethyl)-phenylphenol, 3-(4-tert-butylphenyl)phenol, 2-(4-tert-butylphenyl)phenol, (2,4-diphenyl)phenol, (4-tert-butyl, 2-phenyl)phenol, 2-(4-tert-butylphenyl)phenol, 3-phenylphenol, resorcinol, hexylresorcinol, hexachlorophene, parabens, thymol, chlorothymol, parachlorometaxylenol, orthophenylphenol, p-tertiary butylphenol, p-tertiaryamylphenol, o-benzylphenyl-p-chlorophenol, parachlorophenol, camphorated parachlorophenol, tetrabromomethylphenol, 2,6-dimethyl-4-chlorophenol, parachlorometaxylenol, and combinations thereof.

In some embodiments, the antimicrobial composition may comprise botanical extracts such as chlorhexidine gluconate, benzalkonium chloride, grapeseed oil, and/or acidic citrus juices such lemon juice. In some embodiments, the the antimicrobial composition may comprise an essential oil such as extracts of the bark of *Cinnamomum zeylanicum* (cinnamon) and the rhizomes of *Zingiber officinale* (ginger).

Referring to FIGS. 1 A-B, various embodiments of the present technology may comprise the surface composition formed as a bunker liner 100. Various embodiments of the bunker liner 100 may be a permanent, porous, stabilizing layer for application onto native soil, dirt, or other base material in a golf bunker (i.e., sand trap) area. In some embodiments, the bunker liner 100 may be sufficiently durable to withstand the pressure and/or stress of foot traffic and/or heavy maintenance equipment without cracking, tearing, or otherwise incurring damage. In some embodiments, the bunker liner 100 may be sufficiently thick to allow sand or other top surface material to dry evenly, to retain consistent levels of moisture, and/or reduce potential intrusion of native contaminates into the bunker. As shown in FIG. 2, the bunker liner 100 may comprise pores 104 formed between particulate material 102 that may allow substantially even moisture drainage through and out of the bunker.

In various embodiments, the bunker liner 100 may be formed in a mold that results in an elongated, flexible material that may be rolled, as shown in FIG. 1A. Application of the rolled bunker liner 100 into the bunker may involve placing the roll into the bunker and unrolling the bunker liner 100 to cover the underlying native soil within the bunker. In another embodiment, as shown in FIG. 1B, the bunker liner 100 may be formed in a mold to produce pads of the bunker liner 100, such as rectangles with any suitable dimensions such as 4'×8', which may be rolled. In some embodiments, the dimension of the bunker liner 100 may be selected to be a suitable weight for carrying by hand for easy transportation to the golf course bunker site and placement into the bunker. The spaces 106 between each adjacently positioned bunker liner 100 may fastened together with any suitable fastener, such as tacks, stables, and/or an adhesive.

Referring to FIG. 3A, various embodiments of the bunker liner 100 may comprise a turn-down 300 at one or more edges. In some embodiments, the turn-down 300 may be created by bending the edge of the bunker liner 100, such as by hand. In another embodiment, the turn-down 300 may be formed as part of the shape of a mold in which the bunker liner 100 may be cured. The turn-down 300 may reduce tripping by golfers walking over the bunker liner 100 and reduce the "hooking" of maintenance equipment such as power rakes that travel across the bunker liner to maintain the sand. In some embodiments, this feature may be accomplished with a beveled edge 302, as shown in FIG. 3B. In various embodiments, the turn-down 300 may hook into the ground beneath the turfgrass during installation (as shown in FIGS. 4A-B) in at least partially vertical areas of the bunker 410 (not shown) to further stabilize the position of the bunker liner 100. In various embodiments, the turn-down 300 may be any suitable length to effectively be inserted into the ground for stabilization of the bunker liner 100. For example, in one embodiment, the turn-down 300 may be up to about 2" long. In various embodiments, a small trench may be dug into the ground, such as with a conventional trowel or hoe, to receive the turn-down 300.

In various embodiments, the bunker liner 100 may be molded to include a plurality stabilizing ridges, bumps, or other texture (not shown) on at least one of a top surface and a bottom surface of the bunker liner 100. The stabilizing ridges may stabilize the position of the installed bunker over native soil which may shift over time due to soil conditions, rain, and the like. The stabilizing ridges may contribute to the permanency of the bunker liner 100 within the bunker 410 and may also help retain the shape of the bunker 410, lengthening its life.

The composition of the particulate material 102 may vary depending on the composition of the underlying native turf. In some embodiments, a large rubber crumb or rock may be used for the particulate material 102 to form the pores 104 to provide even and quick drainage of moisture. If the underlying turf is naturally unstable such as sand or mulch that may frequently shift, a thicker and/or more rigid form of the bunker liner 100 with a height 108, for example, of up to several inches may be used to reinforce and/or maintain the shape of the bunker. If the underlying turf is a stable material such as decomposed granite and/or compacted dirt, a thinner, flexible bunker liner 100 with a height 108, for example, of up to about ½ inch may be adequate.

Referring to FIG. 4A, an exemplary bunker liner 100 installed into a bunker 410 is shown. Native soil 400 may be underneath the bunker 410 with turfgrass 402 surrounding the bunker 410. The bunker liner 100 may be placed along the bottom of the bunker 410 beneath sand 408 and over the edge of the bunker 410 underneath the turfgrass 402. The ends 404 of the bunker liner 100, which may comprise the turn-down 300, may be placed beneath the turfgrass 402 to create a defined border between the sand 408 and the turfgrass 402. As shown in FIG. 4B, the turfgrass 402 may be lifted to expose the native soil 400, the ends 404 may be laid under area of lifted turfgrass 402, and the turfgrass 402 may be laid back down over the ends 404.

Referring to FIG. 5, the movement of water 502 and/or other moisture is illustrated. As discussed above, the pores 104 allow the water 502 to move through the bunker liner 100 (shown as paths 504) without allowing the sand 408 to sink through the bunker liner 100. In various embodiments, the pores 104 may also substantially prevent components of the native soil 400 from moving or growing up through the bunker liner 100 to contaminate the sand 408. The water 502 may pass through the bunker liner 100 at substantially the same and/or similar area as the water 502 initially makes contact with the bunker liner 100. Specifically, in at least partially vertical areas of the bunker 410 along its sides, the water 502 may drain out of the sand 408 and through the bunker liner 100. The drainage of the water 502 at or near its point of contact with the bunker liner 100 may reduce or prevent the water from traveling and pooling in the lowest point of the bunker 410 before it drains, which may cause uneven amounts of moisture and dry spots in the sand 408.

Referring to FIG. 6, an exemplary method for making the bunker liner 100 is described that may comprise selecting an appropriate particulate material according to the stability, density, and/or porosity of the underlying turf in the bunker (602). The liquid binder and the selected particulate material components of the bunker liner system may be mixed (604). The mixture may be poured onto a form and allowed to cure to form the bunker liner (606). In some embodiments, the bunker liner may be formed into pieces as thin as ⅜ to ½ inch thick pieces. In some embodiments, the bunker liner may be formed in pads that may be several inches thick. The pieces may be any desirable size. For example, the bunker liner may be poured into a 4'×8' form such as a piece of plywood. In some embodiments, the plywood may be overlaid with a lubricant and/or plastic film to prevent the bunker liner from sticking to the wood form while curing. The bunker liner may be removed from the form (608). Many bunker liners may be made in the forms to produce a desired quantity of bunker liners to cover a desired area of bunker. The bunker liners may be transported to the bunker site, such as by flatbed truck (610). Multiple bunker liners may be laid into the bunker to cover the turf material (612). In one embodiment, multiple bunker liners may be trimmed and fitted together adjacently to form abstract shapes that may be laid over varying surface levels in the bunker with additional bunker liners laid adjacently until the bunker turf material is covered. The bunker liners may be coupled together with any suitable fastener such as staples, adhesive, epoxy, binder, and the like (614). The bunker liner system may then be covered with sand such that it is hidden (616). For example, approximately four inches of sand may be laid on top of the bunker liner system. In some embodiments, the bunker liner may comprise curved edges ("turn-downs") that may create a defining line between native, surrounding turf surface and the bunker material. In other methods, the bunker material may be mixed at the site of the bunker and then poured or sprayed into the bunker. The bunker material may be leveled and/or contoured within the bunker.

Referring to FIG. 7, an exemplary method for installing the bunker liner into a golf course bunker is described. The prefabricated bunker liners may be transported to the bunker site. The sand may be removed from the bunker, exposing the natural turf underneath (702). If turfgrass is present around the bunker, the edge of the turfgrass may be lifted around the periphery of the bunker to expose the natural turf underneath (704). If turfgrass is not present, the bunker liner may be laid over and past the edge of the bunker. The bunker liner may be fixed to the area around the bunker, such as with stables or stakes, and turfgrass may be laid over the bunker liner at a later time. Starting from the middle of the bunker, the bunker liner pads may be unrolled and laid adjacently so the edges touch, but do not overlap (706). The edges of adjacent bunker liners may be fastened together with any suitable fastener, such as staples and/or adhesive (708). The bunker liner may be laid on the natural turf under the turfgrass that was lifted around the edges of the bunker and the turfgrass may be replaced back down over the bunker liner (710). The bunker liner may be cut to a desired size and/or shape in any area of the bunker liner to cover the bunker. The flexibility of the bunker liner may adapt to the contours of the bunker such that the bunker liner lays flat over all portions of the turf underlying the bunker. The sand may be replaced over the bunker liner to make the bunker reader for play (712). In an exemplary installation of the bunker liner into an approximately 1000 square foot bunker, the installation process may take about one hour from start to finish, resulting in the bunker being ready for sand and play.

In the foregoing description, the invention has been described with reference to specific exemplary embodiments. Various modifications and changes may be made, however, without departing from the scope of the present invention as set forth. The description and figures are to be regarded in an illustrative manner, rather than a restrictive one and all such modifications are intended to be included within the scope of the present invention. Accordingly, the scope of the invention should be determined by the generic embodiments described and their legal equivalents rather than by merely the specific examples described above. For example, the steps recited in any method or process embodiment may be executed in any appropriate order and are not limited to the explicit order presented in the specific examples. Additionally, the components and/or elements recited in any system embodiment may be combined in a variety of permutations to produce substantially the same result as the present invention and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition, system, or apparatus that comprises a list of elements does not include only those elements recited, but may also include other elements not expressly listed or inherent to such process, method, article, composition, system, or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The present invention has been described above with reference to an exemplary embodiment. However, changes and modifications may be made to the exemplary embodiment without departing from the scope of the present invention. These and other changes or modifications are intended to be included within the scope of the present invention.

What is claimed is:

1. A cured flexible bunker liner for overlaying native turf in a golf course bunker, the cured flexible bunker liner consisting of:
   a liquid coating composition comprising a polyol;
   a particulate material comprising rubber particles mixed with the liquid coating composition to produce a coated particulate material, wherein the particulate material is selected to:
      form a porous structure with a pore diameter suitable to allow moisture to travel through the bunker liner and prevent particulate matter from traveling through the bunker liner;

form a flexible structure configured to substantially conform to the contours of the golf course bunker; and form a stable structure that retains the shape of the golf course bunker according to the native turf underlying the bunker, and a liquid binder comprising a moisture curing polyurethane based prepolymer, wherein the liquid binder is mixed with the coated particulate material and cured to form the cured flexible bunker liner;

wherein the cured flexible bunker liner overlays the native turf; and wherein the cured flexible bunker liner is not affixed to the native turf.

2. The bunker liner of claim 1, wherein the rubber particles comprise at least one of butadiene-rubber (BR), styrene butadiene-rubber (SBR), isoprene-rubber (IR), styrene-isoprene-butadiene-rubber (SIBR), acrylonitrilebutadiene-rubber (NBR), chloroprene-rubber (CR), isobutene-isoprene-rubber (IIR), ethylene-propylene-diene-monomer-rubber (EPDM) and natural rubber (NR), and vulcanized thermoplastic (TPV).

3. The surface composition of claim 1, wherein the particulate material further comprises at least one of an aggregate material, asphalt particles, sand, ceramics, glass, marble, rock, and gravel particles.

4. The bunker liner of claim 1, wherein the mixture of the liquid binder and coated particulate material is cured into a preselected molded shape.

5. The bunker liner of claim 4, wherein the preselected molded shape comprises stabilizing ridges on at least one of a top surface and a bottom surface of the preformed flexible bunker liner.

6. The bunker liner of claim 1, wherein the preformed flexible bunker liner comprises stabilizing ridges on at least one of a bottom surface and a top surface that provide traction and hold the preformed flexible bunker liner in place in the golf course bunker.

7. The bunker liner of claim 1, wherein the mixture of the liquid binder and particulate material is cured to a thickness of at least approximately ⅜ inches.

8. The bunker liner of claim 1, wherein the liquid binder and particulate material is cured to a thickness of between approximately ⅜ and approximately ½ inches.

9. The bunker liner of claim 1, wherein the preformed flexible bunker liner further comprises a turned-down edge.

10. The bunker liner of claim 1, wherein the turned-down edge is configured to eliminate at least one of a rough edge and a lifted edge.

11. The bunker liner of claim 1, wherein the preformed flexible bunker liner further comprises a beveled edge.

12. The bunker liner of claim 1, wherein the beveled edge is configured to eliminate at least one of a rough edge and a lifted edge.

13. The bunker liner of claim 1, further comprising an herbicide that is at least one of mixed with the liquid binder and the particulate material prior to curing and applied to the cured preformed flexible bunker liner.

14. The bunker liner of claim 1, further comprising an antimicrobial composition that is at least one of mixed with the liquid binder and the particulate material prior to curing and applied to the cured preformed flexible bunker liner.

15. The bunker liner of claim 1, wherein the liquid coating composition comprises at least one of:
a polyol and a catalyst; and
a polyol, a catalyst, and water.

16. The bunker liner of claim 15, wherein polyol comprises at least one of a polyester polyol, a polyoxypropylene polyol, and a polyoxypropylene-polyoxyethylene polyol.

17. A cured flexible bunker liner for application over native turf in a golf course bunker, the cured flexible bunker liner consisting of:
a liquid coating composition;
a particulate material comprising rubber particles mixed with the liquid coating composition to produce a coated particulate material, wherein the particulate material is selected to:
form a porous structure with a pore diameter suitable to allow moisture to travel through the bunker liner and prevent particulate matter from traveling through the bunker liner;
form a flexible structure configured to substantially conform to the contours of the golf course bunker; and form a stable structure that retains the shape of the golf course bunker according to the turf underlying the bunker, and
a liquid binder comprising a moisture curing polyurethane based prepolymer mixed with the coated particulate material and cured into a preselected molded shape to form the cured flexible bunker liner, wherein the preselected molded shape comprises at least one of:
a turned-down edge; and
a plurality of stabilizing ridges on at least one of a bottom surface and a top surface that provide traction and hold the preformed flexible bunker liner in place in the golf course bunker;
wherein the cured flexible bunker liner overlays the native turf; and
wherein the cured flexible bunker liner is not affixed to the native turf.

18. A method of making a cured flexible bunker liner for application over native turf in a golf course bunker comprising:
mixing a liquid coating composition with a particulate material comprising rubber particles to produce a coated particulate material, wherein the particulate material is selected to:
form a porous structure with a pore diameter suitable to allow moisture to travel through the bunker liner and prevent particulate matter from traveling through the bunker liner;
form a flexible structure configured to substantially conform to the contours of the golf course bunker; and
form a stable structure that retains the shape of the golf course bunker according to the turf underlying the bunker,
mixing a liquid binder with the coated particulate material, wherein the liquid binder comprises a moisture curing polyurethane based prepolymer;
pouring the mixture of the liquid binder and coated particulate material into a mold having a preselected thickness, wherein the mold presses a texture onto the mixture of the liquid binder and coated particulate material that stabilizes the position of the cured bunker liner on top of the native soil;
allowing the mixture of the liquid binder and coated particulate material to cure in the mold forming the cured flexible bunker liner, wherein the preselected molded shape comprises at least one of:
a turned-down edge; and a plurality of stabilizing ridges on at least one of a bottom surface and a top surface that provide traction and hold the cured flexible bunker liner in place in the golf course bunker;

removing the cured flexible bunker liner from the mold;

positioning the cured flexible bunker liner in the golf course bunker over the native turf, wherein the cured flexible bunker liner is not affixed to the native turf.

* * * * *